United States Patent
Menon et al.

(10) Patent No.: US 12,462,580 B2
(45) Date of Patent: Nov. 4, 2025

(54) METHOD AND SYSTEM FOR A TIERED TIME SYNCHRONIZATION PROTOCOL FOR A SET OF VEHICLES

(71) Applicant: Ford Global Technologies, LLC, Dearborn, MI (US)

(72) Inventors: Meghna Menon, Ann Arbor, MI (US); Krishna Bandi, Farmington Hills, MI (US); Gregory P. Linkowski, Dearborn, MI (US); Mario Anthony Santillo, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 350 days.

(21) Appl. No.: 18/177,980

(22) Filed: Mar. 3, 2023

(65) Prior Publication Data
US 2024/0296683 A1   Sep. 5, 2024

(51) Int. Cl.
*G06V 20/58*   (2022.01)
*G01S 19/25*   (2010.01)

(52) U.S. Cl.
CPC ............ *G06V 20/58* (2022.01); *G01S 19/256* (2013.01)

(58) Field of Classification Search
CPC .............................. G06V 20/58; G01S 19/256
See application file for complete search history.

(56) References Cited

U.S. PATENT DOCUMENTS

| | | | |
|---|---|---|---|
| 8,255,360 B1 * | 8/2012 | Wallace | G06F 16/273 707/620 |
| 9,677,887 B2 | 6/2017 | Werner et al. | |
| 11,187,774 B2 | 11/2021 | Kassas et al. | |
| 11,249,195 B1 * | 2/2022 | Anvari | H04W 4/80 |
| 2023/0145508 A1 | 5/2023 | Kaphengst et al. | |
| 2023/0243657 A1 * | 8/2023 | Kiyohara | G08G 1/166 701/446 |

FOREIGN PATENT DOCUMENTS

CA   3222026 A1 *  12/2022   ........... A01B 69/008

* cited by examiner

*Primary Examiner* — Pinalben Patel
(74) *Attorney, Agent, or Firm* — Burris Law, PLLC

(57) ABSTRACT

A method includes estimating, by a vehicle communication system, a vehicle-localized time based on a previous vehicle system time and at least one internal factor in response to a primary synchronization data not being received and in response to an auxiliary synchronization data not being received. The previous vehicle system time is based on at least one of a previous primary synchronization data or a previous auxiliary synchronization data. The method further includes synchronizing, by the vehicle communication system, a vehicle system time employed by one or more vehicle modules disposed in the vehicle based on one of the primary synchronization data received, the auxiliary synchronization data received, or the vehicle-localized time estimated.

18 Claims, 3 Drawing Sheets

METHOD AND SYSTEM FOR A TIERED TIME SYNCHRONIZATION PROTOCOL FOR A SET OF VEHICLES

FIELD

The present disclosure relates to synchronizing internal clocks of vehicles.

BACKGROUND

The statements in this section merely provide background information related to the present disclosure and may not constitute prior art.

In various environments, such as manufacturing facilities, automation of vehicles can greatly improve efficiency and cycle time. For example, automated marshalling of vehicles through various stages of manufacturing, such as end-of-line testing, generally employs a vehicle coordination system (e.g., an overhead system or infrastructure server) to route and control motion of the vehicle through the facility. This control may require robust time synchronization between the vehicle coordination system and the vehicles. However, time synchronization is dependent on the transmission of data, which can be interrupted in different environments, such as, but not limited to facilities.

These and other issues related to synchronizing vehicles in a facility are addressed by the present disclosure.

SUMMARY

This section provides a general summary of the disclosure and is not a comprehensive disclosure of its full scope or all of its features.

In one form, the present disclosure is directed to a method that includes determining, by a vehicle communication system, whether a primary synchronization data is received from a global synchronization system, where the vehicle communication system is disposed at a vehicle from among a set of vehicles. The method further includes determining, by the vehicle communication system, whether an auxiliary synchronization data is received from a vehicle coordination system in response to the primary synchronization data not being received, where the vehicle coordination system is configured to monitor travel characteristics of each vehicle of the set of vehicles. The method further includes estimating, by the vehicle communication system, a vehicle-localized time based on a previous vehicle system time and at least one internal factor in response to the primary synchronization data not being received and in response to the auxiliary synchronization data not being received, and synchronizing, by the vehicle communication system, a vehicle system time employed by one or more vehicle modules disposed in the vehicle based on one of the primary synchronization data received, the auxiliary synchronization data received, or the vehicle-localized time estimated. The previous vehicle system time is based on at least one of a previous primary synchronization data or a previous auxiliary synchronization data.

The following paragraph includes variations of the method of the above paragraph, and the variations may be implemented individually or in any combination while remaining within the scope of the present disclosure.

In some variations, the primary synchronization data includes a data timestamp, and the synchronizing the vehicle system time further comprises setting the vehicle system time based on the data timestamp in response to the primary synchronization data being received. In some variations, in response to the auxiliary synchronization data being received, the synchronizing the vehicle system time further includes setting, by the vehicle communication system, the vehicle system time based on the auxiliary synchronization data and a phase locked loop system of at least one of the one or more vehicle modules. In some variations, the vehicle system time is synchronized for one or more software applications being executed at the at least one of the one or more vehicle modules. In some variations, the vehicle system time is set for all software applications provided at the one or more vehicle modules. In some variations, the global synchronization system is a global navigation satellite-based system. In some variations, the internal factor includes data from an object detection sensor of the vehicle, data from an odometer of the vehicle, a routing information for the vehicle, last known pose information of the vehicle, or a combination thereof. In some variations, the method further includes inhibiting, by the vehicle communication system, movement of the vehicle in response to the primary synchronization data and the auxiliary synchronization data not being received and after a selected threshold is satisfied.

In one form, the present disclosure is directed to a system including a vehicle communication system disposed at a vehicle from among a set of vehicles. The vehicle communication system includes one or more processors and one or more nontransitory computer-readable mediums comprising instructions that are executable by the one or more processors. The instructions include determining whether a primary synchronization data is received from a global synchronization system, determining whether an auxiliary synchronization data is received from a vehicle coordination system in response to the primary synchronization data not being received, estimating a vehicle-localized time based on a previous vehicle system time and at least one internal factor in response to the primary synchronization data not being received and in response to the auxiliary synchronization data not being received, and synchronizing a vehicle system time based on one of the primary synchronization data received, the auxiliary synchronization data received, or the vehicle-localized time estimated. The previous vehicle system time is based on at least one of a previous primary synchronization data or a previous auxiliary synchronization data. The vehicle system time is employable by at least one of one or more vehicle modules disposed in the vehicle.

The following paragraph includes variations of the system of the above paragraph, and the variations may be implemented individually or in any combination while remaining within the scope of the present disclosure.

In some variations, the primary synchronization data includes a data timestamp, and the instructions for synchronizing the vehicle system time further comprises setting the vehicle system time based on the data timestamp in response to the primary synchronization data being received. In some variations, the system further includes a vehicle coordination system configured to monitor travel characteristics of each vehicle of the set of vehicles. The vehicle coordination system includes one or more processors and one or more nontransitory computer-readable mediums comprising instructions that are executable by the one or more processors, where the instructions includes outputting the auxiliary synchronization data that includes data indicative of a secondary timestamp. In some variations, in response to not receiving the auxiliary synchronization data, the instructions of the vehicle communication system for synchronizing the vehicle system time stored in the one or more nontransitory computer-readable mediums of the vehicle communication system further includes setting the vehicle system time based on the auxiliary synchronization data and a phase locked loop system of at least one of the one or more vehicle modules. In some variations, the vehicle system time is synchronized for one or more software applications being executed at the at least one of the one or more vehicle modules. In some variations, the vehicle system time is set for all software applications provided at the one or more vehicle modules. In some variations, the internal factor includes data from an object detection sensor of the vehicle, data from an odometer of the vehicle, a routing information for the vehicle, last known pose information of the vehicle, or a combination thereof. In some variations, the instructions of the vehicle communication system further includes inhibiting movement of the vehicle in response to the primary synchronization data and the auxiliary synchronization data not being received after a selected threshold is satisfied.

In one form, the present disclosure directed to a method that includes determining, by a vehicle communication system, whether a primary synchronization data is received from a global synchronization system, where the vehicle communication system is disposed at a vehicle from among a set of vehicles; and setting a vehicle system time based on a timestamp of the primary synchronization data in response to the primary synchronization data being received. The method further includes determining, by the vehicle communication system, whether an auxiliary synchronization data is received from a vehicle coordination system in response to the primary synchronization data not being received, where the vehicle coordination system is configured to monitor travel characteristics of each vehicle of the set of vehicles. The method further includes estimating, by the vehicle communication system, a vehicle-localized time based on a previous vehicle system time and at least one internal factor in response to the primary synchronization data not being received and in response to the auxiliary synchronization data not being received, synchronizing, by the vehicle communication system, the vehicle system time employed by one or more vehicle modules disposed in the vehicle based on one of the primary synchronization data received, the auxiliary synchronization data received, or the vehicle-localized time estimated, and inhibiting, by the vehicle communication system, movement of the vehicle in response to the primary synchronization data and the auxiliary synchronization data not being received and after a selected threshold is satisfied. The previous vehicle system time is based on at least one of a previous primary synchronization data or a previous auxiliary synchronization data.

The following paragraph includes variations of the method of the above paragraph, and the variations may be implemented individually or in any combination while remaining within the scope of the present disclosure.

In some variations, in response to the auxiliary synchronization data being received, the synchronizing the vehicle system time further includes setting, by the vehicle communication system, the vehicle system time based on the auxiliary synchronization data and a phase locked loop system of at least one of the one or more vehicle modules. In some variations, the vehicle system time is synchronized for one or more software applications being executed at the at least one of the one or more vehicle modules. In some variations, the vehicle system time is set for all software applications provided at the one or more vehicle modules.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
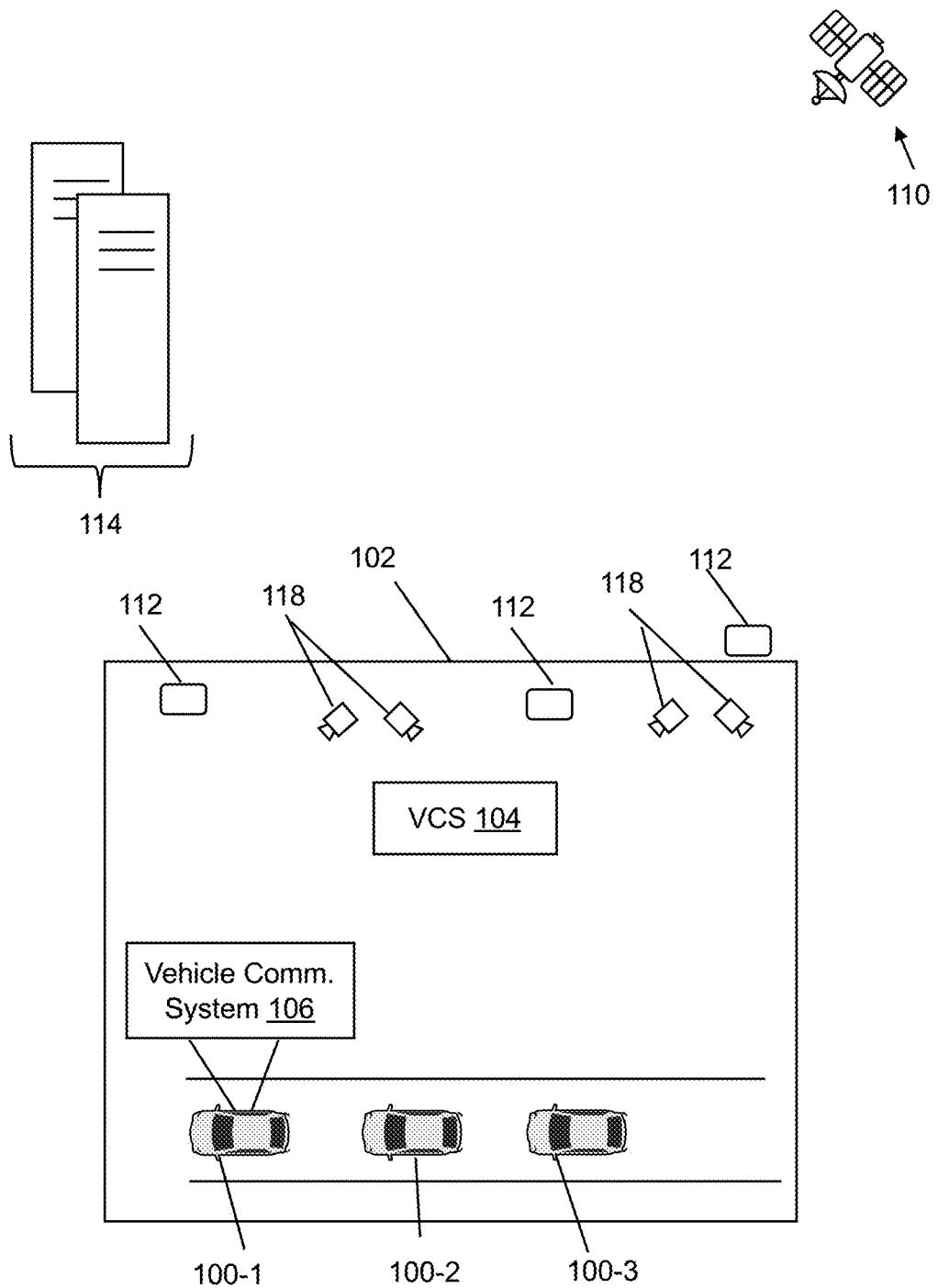
FIG. 1 illustrates vehicles having a vehicle communication system in accordance with the present disclosure system.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Referring to FIG. 1, vehicles 100-1, 100-2, 100-3 (collectively vehicles 100) provided in a facility 102 are configured to autonomously travel under the guidance of a vehicle coordination system 104. In some applications, the vehicles 100 may be directed to form a fleet autonomously traveling in the facility 102. To receive information from the vehicle coordination system 104 and other external devices, each vehicle 100 may include a vehicle communication system 106 configured to wirelessly communicate with the external devices.

In one form, the vehicle coordination system 104 and the vehicles 100 are also in communication with a vehicle original equipment manufacturer (OEM) server 114 via a wireless communication link. The vehicle OEM server 114 stores information related to each of the vehicles 100 such as, but not limited to, vehicle identification number, bill-of-material related to the vehicle, and/or communication codes for transmitting start-up and/or shutdown commands via the vehicle communication system 106. In some example applications, the vehicle OEM server 114 may be provided at the facility 102 or provided as a cloud-based server.

The vehicles 100, the vehicle coordination system 104 and the vehicle OEM server 114 may be communicably coupled via one or more wireless communication links supported by one or more wireless networks. The wireless networks may be realized using the same and/or different technologies, such as cellular-based communication, Wifi-based communication, Bluetooth-type communication, among others. In one form, the vehicles 100, the vehicle coordination system 104 and the vehicle OEM server 114 are configured to support different types of wireless communication networks.

To provide accurate and safe routing, internal clocks of the vehicles 100, the vehicle coordination system 104, and the vehicle OEM server 114 are synchronized based on synchronization data from a global synchronization system 110, such as a global navigation satellite system (GNSS). The synchronization data, which may also be referred to as a primary synchronization data, includes a timestamp (i.e., a data timestamp) employed for setting the internal clocks. The facility 102 may include repeaters 112 to improve transmission of signals from the global synchronization system 110. In some instances, the vehicles 100 may not receive the synchronization data from the global synchronization system 110, and as described herein, may employ secondary data (e.g., auxiliary synchronization data, a vehicle-localized time) to set internal clocks.

Figure 2:
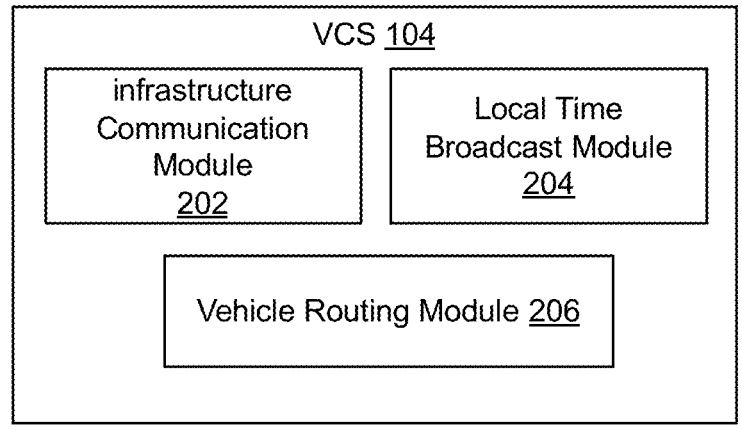
FIG. 2 is a block diagram of a vehicle coordination system in accordance with the present disclosure.

Referring to FIG. 2, among other operations, the vehicle coordination system 104 is configured to monitor travel characteristics of each vehicle 100 and provide travel instructions to the vehicles 100 for having each vehicle 100 travel to a desired location. In one form, the vehicle coordination system 104 includes an infrastructure communication module 202, a local time broadcast module 204, and a vehicle routing module 206. The infrastructure communication module 202 is configured to exchange data and thus, communicate with devices within the facility 102 and devices outside of the facility 102, such as the vehicle OEM server 114 and the global synchronization system 110. For example, the facility 102 may include one or more vision systems having cameras 118 (FIG. 1), which provide images of areas of the facility 102. As described below, the vehicle routing module 206 is configured to guide vehicles 100 based on the images.

The local time broadcast module 204 is configured to broadcast signals including data indicative of a secondary timestamp. In one form, the local time broadcast module 204 employs cellular networks and protocols for transmitting the signal having the secondary timestamp. As described herein, if the primary synchronization data is not received from the global synchronization system 110, the vehicles 100 are configured to synchronize one or more internal clocks with the secondary timestamp using a phase locked loop technique. Accordingly, the broadcasted signals may also be referred to as an auxiliary synchronization data.

Figure 3:
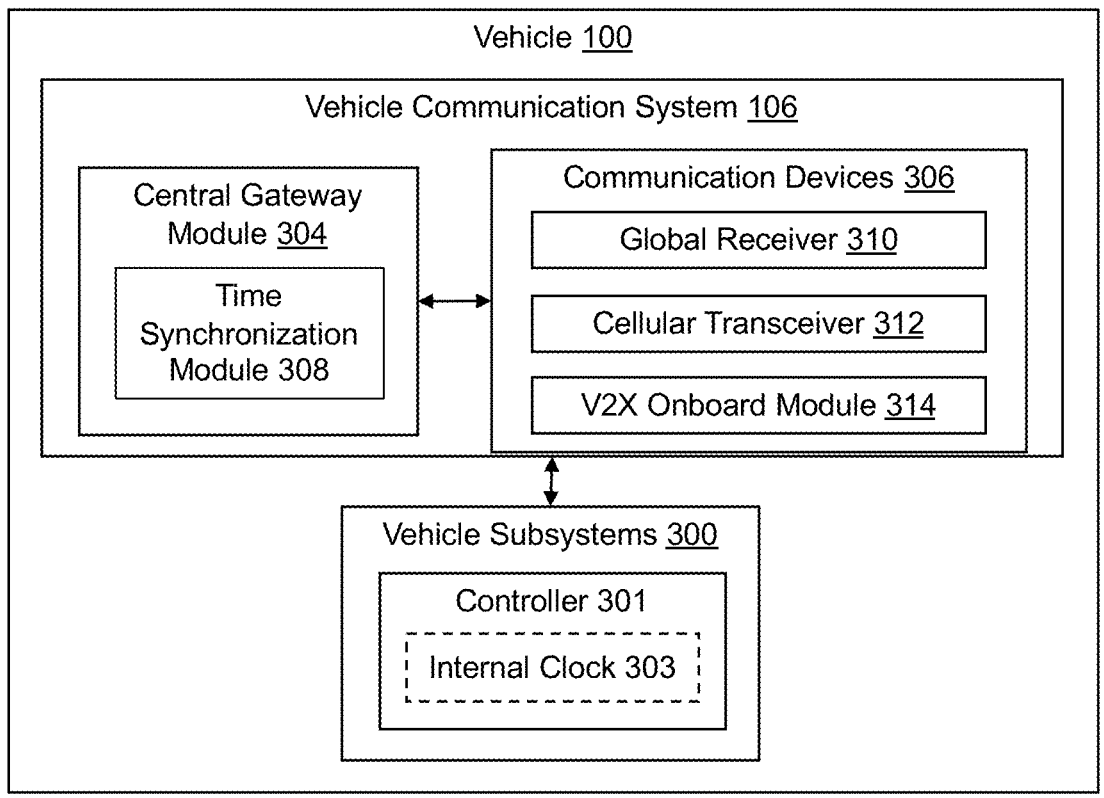
FIG. 3 is a block diagram of a vehicle communication system.

The vehicle routing module 206 is configured to control travel characteristics of each vehicle 100. More specifically, the vehicle routing module 206 is configured to provide travel information to the vehicles 100 so that each vehicle 100 may autonomously travel through the facility 102. For example, using the images from the cameras 118 of the vision system and known object detection techniques, the vehicle routing module 206 is configured to detect and/or locate the vehicles 100 and detect potential obstacles in the path of the vehicles. Using detected object and other information, the vehicle routing module 206 is configured to define travel paths for the vehicles 100 and form one or more fleets of vehicle traveling together through the facility 102. The travel information my include, but is not limited to, pose, potential obstacles, routes, and/or speed. In some variations, the vehicle routing module 206 is configured to communicate directly with the vehicle 100 to provide the travel information. In other variations, the vehicle routing module 206 is configured to communicate with the vehicles via the infrastructure communication module 202, Referring to FIG. 3, each vehicle 100 includes the vehicle communication system 106 and one or more vehicle subsystems 300 controlling various systems within the vehicle 100. The vehicle subsystems 300 may include, but is not limited to, infotainment systems, transmission system, power drive system, and/or heating-ventilation-air cooling systems. In one form, the vehicle subsystems 300 may include one or more controllers (e.g., controller 301 of FIG. 3) having internal clock(s) (e.g., internal clock 303 of FIG. 3) to be synchronized with each other and the vehicle coordination system 104.

The vehicle communication system 106 includes a central gateway module 304 and a set of communication devices (i.e., "communication devices 306" hereinafter). The central gateway module 304 is generally provided as a communication node providing communication between internal communication buses/networks, generally provided as wired communication, and between the internal communication buses with external devices. In some applications, the internal communication busses are provided as controlled area networks (CAN) and/or local interconnect networks (LIN). In one form, the central gateway module 304 includes a time synchronization module 308 for synchronizing internal clocks of one or more controllers provided at one or more of the vehicle subsystems 300.

The communication devices 306 includes one or more hardware and software protocols for establishing wireless communication links with external devices. The communication devices 306 may include, but is not limited to, a global receiver 310 configured to receive signal/data from the global synchronization system 110, a cellular transceiver 312 configured to transmit and/or receive signals via cellular network, and a vehicle-to-anything (V2X) onboard module 314 that supports V2X communication. In some applications, the V2X onboard module 314 is configured to directly communicate with the vehicle routing module 203 to receive travel information. Alternatively, the V2X onboard module 314 is in communication with the infrastructure communication module 202 to receive the travel information. In one form, the communication devices 306 transfers data received to the central gateway module 304 and transmits data from the central gateway module 304 to a selected external device.

Figure 4:
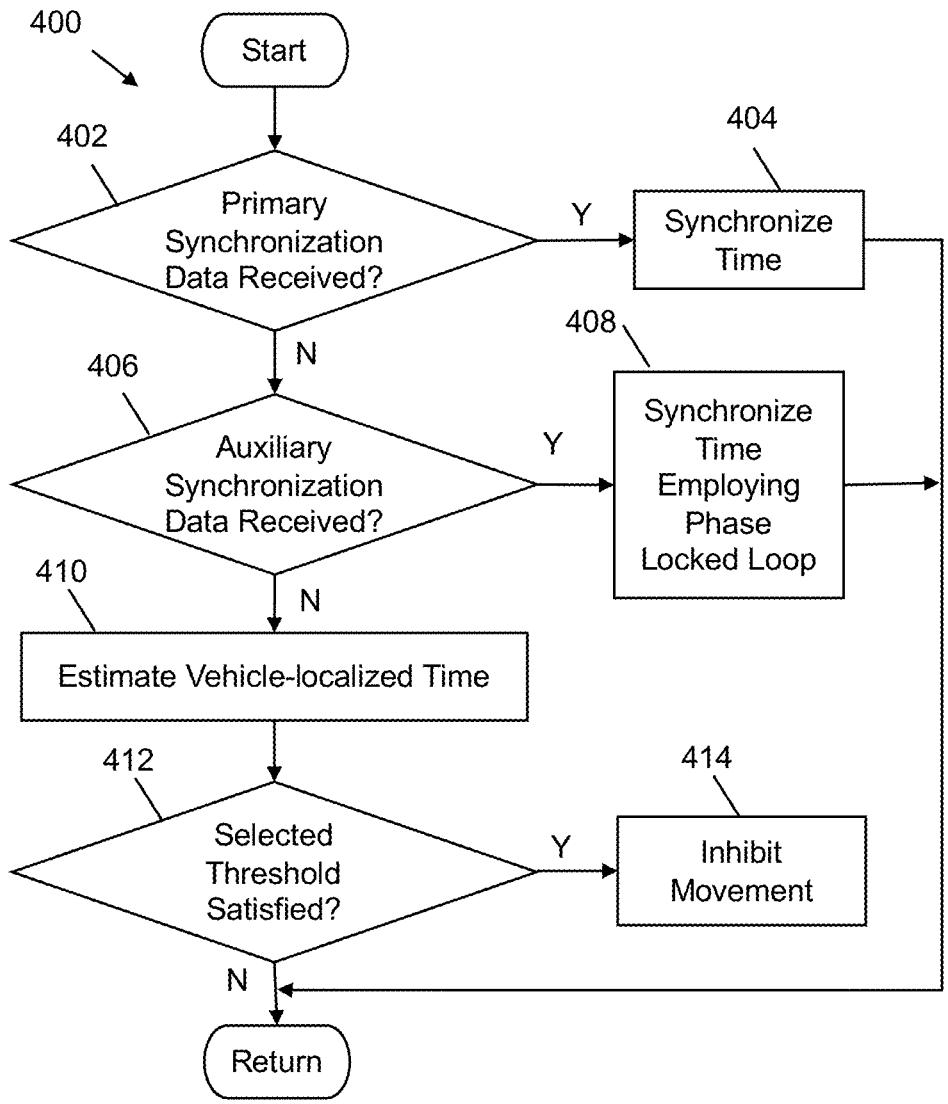
FIG. 4 is a flowchart of an example time synchronization routine in accordance with the present disclosure.

In one form, the time synchronization module 308 is configured to provide multi-tiered time synchronization protocol for the vehicles 100 autonomously traveling in the facility 102. Referring to FIG. 4, an example multi-tiered time synchronization protocol 400 executed by the time synchronization module 308 is provided. At 402, the time synchronization module 308 determines whether the primary synchronization data is received from the global synchronization system 110. For example, the time synchronization module 308 determines if the primary synchronization data is received via the communication devices 306. If the primary synchronization data is received, the time synchronization module 308 synchronizes a vehicle system time based on the primary synchronization data, at 404. For example, the vehicle system time, or more specifically, the internal clocks 303 of one or more controllers 301, is set using the data timestamp of the primary synchronization data received. That is, the data timestamp may be provided in reference to a particular time zone (e.g., coordinated universal time (UTC)) or clock (e.g., atomic clock), and the time synchronization module 308 uses known techniques to convert the time to respective time zone or standard of the vehicle 100. The central gateway module 304 provides the vehicle system time to one or more of the internal clocks.

If the primary synchronization data is not received, the time synchronization module 308 determines whether the auxiliary synchronization data is received from the vehicle coordination system 104, at 406. For example, the time synchronization module 308 determines if the auxiliary synchronization data is received via the communication devices 306. If the auxiliary synchronization data is received, the central gateway module 304 synchronizes the vehicle system time using the auxiliary synchronization data having the secondary timestamp and phase locked loop technique, at 408. More particularly, for the phase locked loop (PLL) technique, a phase locked loop circuit shifts the vehicle system time until it is locked with the secondary timestamp. In one example, among other components, the PLL circuit includes a phase comparator, loop filter, and a voltage-controlled oscillator, where the PLL circuit is provided at the controller 301 of the vehicle subsystem 300. Accordingly, the auxiliary synchronization data having the secondary timestamp is provided as input time and the current vehicle system time of a selected controller 301 of a selected vehicle subsystem 300 adjusts its vehicle system time until it matches that of the second timestamp. In one form, the vehicle system time is set for all software applications provided in the vehicle 100. In another form, only controllers 301 that are executing a software application set respective internal clocks 303 using the auxiliary synchronization data. That is, the central gateway module 304 provides the auxiliary synchronization data to software applications that are in use so that the selected application(s) synchronize respective times with the auxiliary synchronization data.

If the auxiliary synchronization data is not received, the time synchronization module 308 estimates a vehicle-localized time, as the vehicle system time, based on a previous vehicle system time and at least one internal factor, at 410. The previous vehicle system time is based on at least one of a previous primary synchronization data or a previous auxiliary synchronization data. Specifically, employing dead reckoning, if the local time broadcast is not available, then the vehicle 100 will maintain updated time synchronization and maneuvering employing onboard vehicle odometry and one or more internal factors. The internal factor includes, but is not limited to, data from an object detection sensor of the vehicle 100, data from an odometer of the vehicle 100, travel information for the vehicle 100, last known pose information of the vehicle 100, or a combination thereof. For example, using the speed of the vehicle 100 and distance travelled since the previous vehicle system, the time synchronization module 308 is configured to determine the amount of time passed and add it to the previous vehicle system time to determine the vehicle localized time.

At 412, the time synchronization module 308 determines if a selected threshold is satisfied. That is, the selected threshold may be indicative of time, distance, and/or pose, or other suitable factor, such as detection of an obstacle. For example, the protocol determines if a predetermined time period has passed, or whether a certain distance was traveled. If the selected threshold has not be satisfied, the vehicle 100 continues to move until the selected threshold is satisfied or the vehicle 100 obtains at least one of primary synchronization data or auxiliary synchronization data. If the selected threshold is satisfied, the vehicle 100 comes to a stop or in other words is inhibited from moving, at 414. For example, the transmission system or powertrain system control the vehicle 100 to a stop.

During the time the vehicle 100 has not received the primary synchronization data or the preliminary synchronization data and before the selected threshold is satisfied, the vehicle 100 can be controlled in various suitable ways. For example, the vehicle 100 may continue to move, the speed of the vehicle 100 may be reduced, and/or the vehicle 100 may monitor its surroundings via the object detection system and if an obstacle is detected, the vehicle is controlled to a stop.

While the multi-tiered time synchronization module is applied to vehicles in a facility, the time synchronization module may be applied to other applications such as, but not limited to: marshalling vehicles to and from charging stations, depot marshalling in which vehicles are commercial vans that are moved through warehouse depots automatically to load and process items; and moving autonomous vehicle through parking structures (e.g., underground parking or covered parking structures).

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components (e.g., op amp circuit integrator as part of the heat flux data module) that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method comprising:
   determining, by a vehicle communication system, whether a primary synchronization data is received from a global synchronization system, wherein the vehicle communication system is disposed at a vehicle from among a set of vehicles;
   determining, by the vehicle communication system, whether an auxiliary synchronization data is received from a vehicle coordination system in response to the primary synchronization data not being received, wherein the vehicle coordination system is configured to monitor travel characteristics of each vehicle of the set of vehicles;
   estimating, by the vehicle communication system, a vehicle-localized time based on a previous vehicle system time and at least one internal factor in response to the primary synchronization data not being received and in response to the auxiliary synchronization data not being received, wherein the previous vehicle system time is based on at least one of a previous primary synchronization data or a previous auxiliary synchronization data; and
   synchronizing, by the vehicle communication system, a vehicle system time employed by one or more vehicle modules disposed in the vehicle based on the estimated vehicle-localized time.

2. The method of claim 1, wherein:
   the primary synchronization data includes a data timestamp, and
   the synchronizing the vehicle system time further comprises setting the vehicle system time based on the data timestamp in response to the primary synchronization data being received.

3. The method of claim 1, wherein, in response to the auxiliary synchronization data being received, the synchronizing the vehicle system time further comprises setting, by the vehicle communication system, the vehicle system time based on the auxiliary synchronization data and a phase locked loop system of at least one of the one or more vehicle modules.

4. The method of claim 3, wherein the vehicle system time is synchronized for one or more software applications being executed at the at least one of the one or more vehicle modules.

5. The method of claim 3, wherein the vehicle system time is set for all software applications provided at the one or more vehicle modules.

6. The method of claim 1, wherein the global synchronization system is a global navigation satellite-based system.

7. The method of claim 1, wherein the internal factor includes data from an object detection sensor of the vehicle, data from an odometer of the vehicle, a routing information for the vehicle, last known pose information of the vehicle, or a combination thereof.

8. The method of claim 1 further comprising inhibiting, by the vehicle communication system, movement of the vehicle in response to the primary synchronization data and the auxiliary synchronization data not being received and after a selected threshold is satisfied.

9. A system comprising:
   a vehicle communication system disposed at a vehicle from among a set of vehicles, the vehicle communication system comprising one or more processors and one or more nontransitory computer-readable mediums comprising instructions that are executable by the one or more processors,
   wherein the instructions comprise:
      determining whether a primary synchronization data is received from a global synchronization system;
      determining whether an auxiliary synchronization data is received from a vehicle coordination system in response to the primary synchronization data not being received;
      estimating a vehicle-localized time based on a previous vehicle system time and at least one internal factor in response to the primary synchronization data not being received and in response to the auxiliary synchronization data not being received, wherein the previous vehicle system time is based on at least one of a previous primary synchronization data or a previous auxiliary synchronization data; and
      synchronizing a vehicle system time based on one of the primary synchronization data received, the auxiliary synchronization data received, or the vehicle-localized time estimated, wherein the vehicle system time is employable by at least one of one or more vehicle modules disposed in the vehicle, wherein the instructions for synchronizing the vehicle system time further comprises setting the vehicle system time based on the auxiliary synchronization data and a phase locked loop system of at least one of the one or more vehicle modules.

10. The system of claim 9, wherein:
    the primary synchronization data includes a data timestamp, and
    the instructions for synchronizing the vehicle system time further comprises setting the vehicle system time based on the data timestamp in response to the primary synchronization data being received.

11. The system of claim 9 further comprising a vehicle coordination system configured to monitor travel characteristics of each vehicle of the set of vehicles, the vehicle coordination system includes one or more processors and one or more nontransitory computer-readable mediums comprising instructions that are executable by the one or more processors, wherein the instructions comprise outputting the auxiliary synchronization data, wherein the auxiliary synchronization data includes data indicative of a secondary timestamp.

12. The system of claim 9, wherein the vehicle system time is synchronized for one or more software applications being executed at the at least one of the one or more vehicle modules.

13. The system of claim 9, wherein the vehicle system time is set for all software applications provided at the one or more vehicle modules.

14. The system of claim 9, wherein the internal factor includes data from an object detection sensor of the vehicle, data from an odometer of the vehicle, a routing information for the vehicle, last known pose information of the vehicle, or a combination thereof.

15. The system of claim 9, wherein the instructions further comprises inhibiting movement of the vehicle in response to the primary synchronization data and the auxiliary synchronization data not being received after a selected threshold is satisfied.

16. A method comprising:
    determining, by a vehicle communication system, whether a primary synchronization data is received from a global synchronization system, wherein the vehicle communication system is disposed at a vehicle from among a set of vehicles;

setting a vehicle system time based on a timestamp of the primary synchronization data in response to the primary synchronization data being received;

determining, by the vehicle communication system, whether an auxiliary synchronization data is received from a vehicle coordination system in response to the primary synchronization data not being received, wherein the vehicle coordination system is configured to monitor travel characteristics of each vehicle of the set of vehicles;

estimating, by the vehicle communication system, a vehicle-localized time based on a previous vehicle system time and at least one internal factor in response to the primary synchronization data not being received and in response to the auxiliary synchronization data not being received, wherein the previous vehicle system time is based on at least one of a previous primary synchronization data or a previous auxiliary synchronization data;

synchronizing, by the vehicle communication system, the vehicle system time employed by one or more vehicle modules disposed in the vehicle based on one of the primary synchronization data received, the auxiliary synchronization data received, or the vehicle-localized time estimated; and inhibiting, by the vehicle communication system, movement of the vehicle in response to the primary synchronization data and the auxiliary synchronization data not being received and after a selected threshold is satisfied, wherein, in response to the auxiliary synchronization data being received, the synchronizing the vehicle system time further comprises setting, by the vehicle communication system, the vehicle system time based on the auxiliary synchronization data and a phase locked loop system of at least one of the one or more vehicle modules.

17. The method of claim 16, wherein the vehicle system time is synchronized for one or more software applications being executed at the at least one of the one or more vehicle modules.

18. The method of claim 16, wherein the vehicle system time is set for all software applications provided at the one or more vehicle modules.

* * * * *